Patented Jan. 23, 1923.

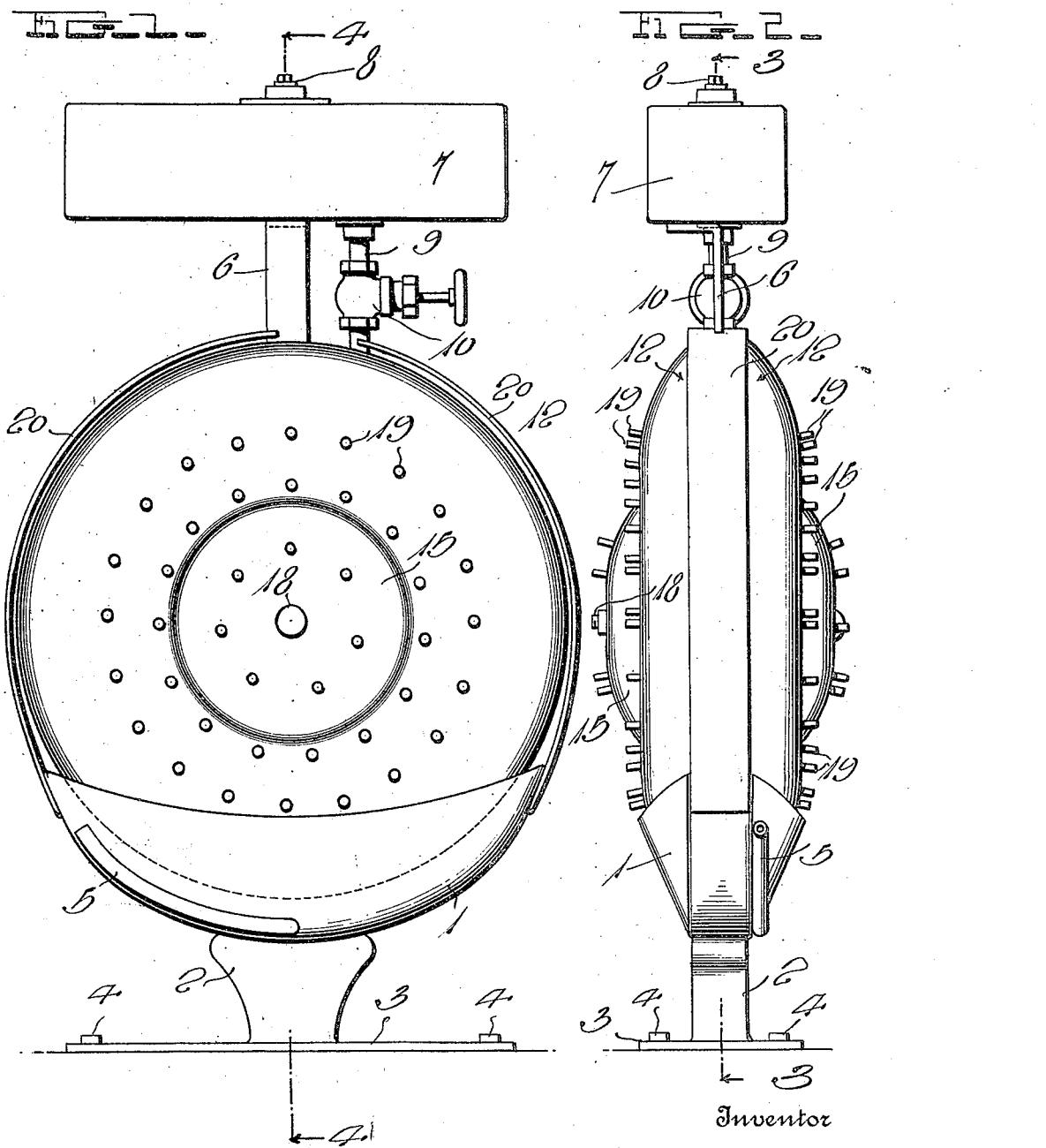

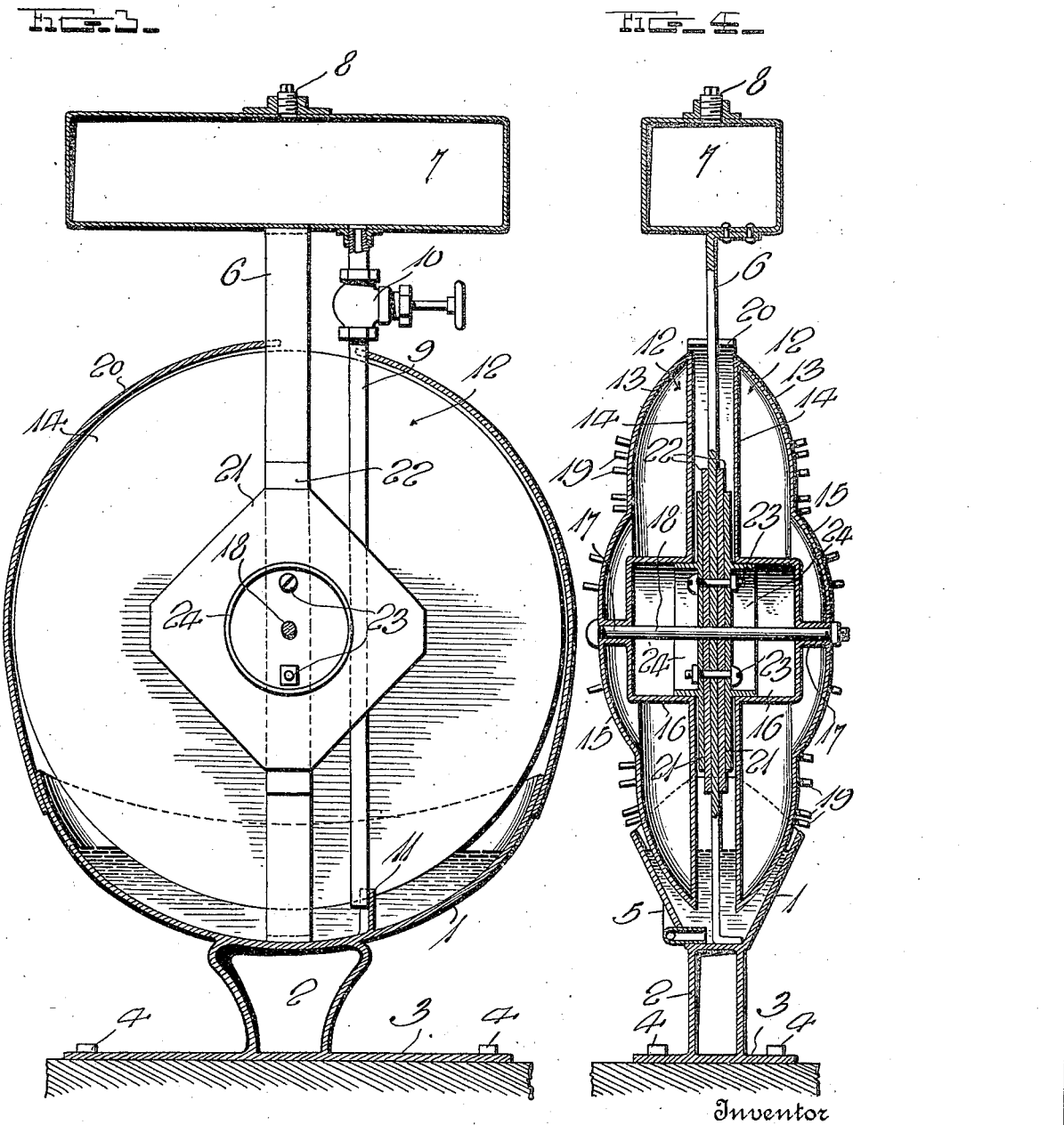

1,442,891

UNITED STATES PATENT OFFICE.

ISAAC W. LEEPER, OF EAST MOLINE, ILLINOIS, ASSIGNOR OF ONE-HALF TO J. LAWRENCE GREER, OF EAST MOLINE, ILLINOIS.

HOG OILER.

Application filed December 19, 1921. Serial No. 523,403.

*To all whom it may concern:*

Be it known that I, ISAAC W. LEEPER, a citizen of the United States, residing at East Moline, in the county of Rock Island and State of Illinois, have invented certain new and useful Improvements in Hog Oilers; and I do declare the following to be a full, clear, and exact description of the invention, such as will enable others skilled in the art to which it appertains to make and use the same.

This invention relates to an improved hog oiler of the type in which oil is applied to the hog by the hog rubbing against a device which is movably mounted and extends into an oil pan so that when the hog rubs against this device, the oil will be applied to the hog's skin and vermin thus killed.

One object of the invention is to provide a hog oiler which will be very compact and which will be so constructed that a reservoir for carrying surplus oil may be mounted upon the standard which extends upwardly from the pan and has the rubbing disks rotatably connected therewith.

Another object of the invention is to so construct this oiler that a pipe leading from the reservoir to the oil pan may extend between rubbing disks where it will be protected and thus prevented from being bent out of shape and broken by hogs rubbing against it.

Another object of the invention is to provide a hog oiler in which the rubbing disks may be rotatably mounted in a very efficient manner and the two disks rotatably held in place by means of a single bolt which serves to rotatably hold both of the disks upon bearing elements secured upon opposite sides of the standard.

Another object of the invention is to provide a hog oiler in which the pan may be provided with guard strips which extend upwardly about the edge portions of the rubbing disks and cover space between the two rubbing disks.

This invention is illustrated in the accompanying drawings, wherein:

Figure 1 is a view showing the improved hog oiler in side elevation.

Figure 2 is a view showing the hog oiler in end elevation.

Figure 3 is a vertical sectional view taken along the line 3—3 of Fig. 2.

Figure 4 is a vertical sectional view taken along the line 4—4 of Fig. 1.

This improved hog oiler is provided with an oil pan 1 which is provided with a supporting standard 2 carried by a base plate 3 through which fasteners 4 may pass to secure the oiler upon a suitable foundation. This oil pan is substantially crescent-shaped as shown in Figs. 1 and 4 and is provided with a water outlet pipe 5 which extends from the lower portion of the pan to a point above the normal oil level. This oil pan is of such shape that it may be filled to the normal oil level and then if water is poured into the pan to a sufficient amount to cause the water to flow out through the overflow pipe 5, the oil will be held in the upper portion of the pan and will not flow over the upper edge of the pan. It will thus be seen that if rain water runs into the pan, this rain water cannot accumulate to such an extent that it will cause the oil to flow out of the top of the pan.

A standard 6 is mounted in the pan as shown in Fig. 4 and extends upwardly and has its upper end portion connected with a reservoir 7. This reservoir is provided with an inlet normally closed by the plug 8 and is provided with an outlet from which extends a conduit pipe 9 through which the oil will pass from the reservoir 7 into the oil pan 1. A suitable valve 10 is provided so that the flow of oil through this pipe 9 may be controlled. At its lower end, the pipe engages a guard 11 which serves to prevent the pipe from having swinging movement in one direction which might cause the pipe to be broken.

The rubbing disks 12 are positioned upon opposite sides of the standard and each will be preferably formed of sheet metal having an outer wall 13 and an inner wall 14, the outer wall which is arcuate in cross section having an extended central portion 15 and the inner wall 14 which is flat having its central portion extended inwardly to provide a cup 16. In the present illustration, this cup 16 is provided with a neck extension 17 leading to the outer wall and providing each of the rubbing disks with a bearing sleeve through which the bolt 18 will extend. Prongs 19 extend from the outer wall of the rubbing disks so that these prongs will serve as scratching elements and further cause the disks to be readily rotated when the hog is rubbing against the disks. Guard strips 20 are secured to the end portions of the pan 1 and extend upwardly about the edge portions of the two disks and have their upper end portions cut out to fit in close engagement with the pipe 9 and standard 6. By having the upper end portions of these guard strips fitting about the standard and pipe, the guard strips will be braced and cannot be readily broken loose by a hog attempting to rub against one edge portion of a strip. These guard strips cover the space between the disks and serve to prevent trash from getting into the pan between the disks. The device will thus be prevented from becoming clogged by leaves or other trash.

In order to rotatably mount the disks, there have been provided bearing plates 21 which fit against reinforcing strips 22 placed against opposite sides of the standard 6. Securing bolts 23 extend through the standard and bracing strips and bearing plates so that the strips and bearing plates will be securely but releasably held in place. It will thus be seen that these bearing plates can be removed in order to permit of repair when necessary. Each of these plates carries an outstanding ring or collar 24, these collars fitting into the cups 16 and thus rotatably mounting the disks in a very effective manner.

When this device is assembled, the strips 22 and bearing plates 21 are first secured against opposite sides of the standard and as shown in Fig. 3 will extend upon opposite sides of the pipe 9 which extends downwardly into the pan from the reservoir carried by the standard. The rubbing disks can then be put in place with the collars or sleeves fitting into the cup and the bolt 18 will then be passed through the disks and the securing nut placed upon the bolt so that the bolt will serve to hold the disks in place. From an inspection of Fig. 4, it will be readily seen that these disks will be rotatably mounted upon the sleeve 24 and will have their outer portions rotatably supported upon the end portions of the bolts. When a hog rubs against the prongs of the disks, these disks will be rotated and oil will be applied to the sides of the hog. This device will thus operate in a very efficient manner and will be neat and attractive in appearance.

I claim:

1. A hog oiler comprising a pan, a standard carried by said pan, a reservoir carried by said standard, rubbing disks rotatably mounted upon opposite sides of said standard and vertically disposed and having their lower portions extending into said pan, and a conduit leading from the reservoir and extending between the rubbing disks into the pan.

2. A hog oiler comprising a pan, a standard carried by said pan, plates secured upon opposite sides of said standard, bearing collars extending from said plates, rubbing disks upon opposite sides of the standard having their lower portions extending into said pan, said disks having inner and outer walls, the inner walls being provided with pockets receiving said collars and engaging the outer walls to brace the same against inward pressure and securing rods extending through the disk plates and standard to rotatably hold the disks upon the collars.

3. A hog oiler comprising an oil pan, a standard extending above said pan intermediate the length and width thereof, rubbing disks upon opposite sides of said standard having their lower end portions extending into said pan, and pivot means extending through the disks and standard to rotatably mount the disks, each of said disks being in the form of a flat disk providing a main rubbing surface and having its central portion above the pan projected outwardly to provide an auxiliary rubbing surface.

In testimony whereof I have hereunto set my hand.

ISAAC W. LEEPER.